United States Patent [19]
Gross et al.

[11] Patent Number: 5,731,939
[45] Date of Patent: Mar. 24, 1998

[54] QUENCH-PROTECTING ELECTRICAL CIRCUIT FOR A SUPERCONDUCTING MAGNET

[75] Inventors: Dan Arthur Gross, Niskayuna, N.Y.; Bu-Xin Xu, Florence, S.C.

[73] Assignee: General Electric Company, Schenectady, N.Y.

[21] Appl. No.: 707,551

[22] Filed: Sep. 4, 1996

[51] Int. Cl.$^6$ .................................................. H02H 9/00
[52] U.S. Cl. ............................................... 361/19; 361/115
[58] Field of Search .................................. 361/19, 115, 93

[56] References Cited

U.S. PATENT DOCUMENTS

| | | | |
|---|---|---|---|
| 3,925,707 | 12/1975 | Bhate et al. | 361/19 |
| 4,764,837 | 8/1988 | Jones | 361/19 |
| 4,956,740 | 9/1990 | Williams | 361/19 |
| 4,977,039 | 12/1990 | Onishi et al. | 361/19 |

OTHER PUBLICATIONS

U.S. Patent Application Serial No. 08/565,140, filed Nov. 30, 1995, by Gross et al., entitled "Superconducting Magnet Electrical Circuit Having Voltage and Quench Protection".

U.S. Patent Application Serial No. 08/565,139, filed Nov. 30, 1995, by Gross, entitled "Superconducting Magnet Electrical Circuit Offering Quench Protec-Tion".

U.S. Patent Application Serial No. 08/514,332, filed Aug. 11, 1995, by Salasoo, entitled "Electrical Circuit for Protecting a Superconducting Magnet During a Quench".

*Primary Examiner*—Marc S. Hoff
*Assistant Examiner*—Stephen W. Jackson
*Attorney, Agent, or Firm*—Douglas E. Erickson; Marvin Snyder

[57] ABSTRACT

A quench-protecting superconductive-magnet electrical circuit. An impregnated superconductive-switch wire is coupled to the leads of a cryostable superconductive-coil assemblage having series-coupled coil portions. Series-coupled fan-in resistive heaters are also coupled in parallel with corresponding coil portions and are positioned thermally proximate the superconductive-switch wire. Fan-out resistive heaters are coupled in parallel with corresponding coil portions and are positioned thermally proximate corresponding coil portions. A local quench in one coil portion activates its corresponding fan-in resistive heater which quenches the superconductive-switch wire which activates all of the fan-out resistive heaters which globally quenches all of the coil portions thereby preventing local quench damage.

11 Claims, 1 Drawing Sheet

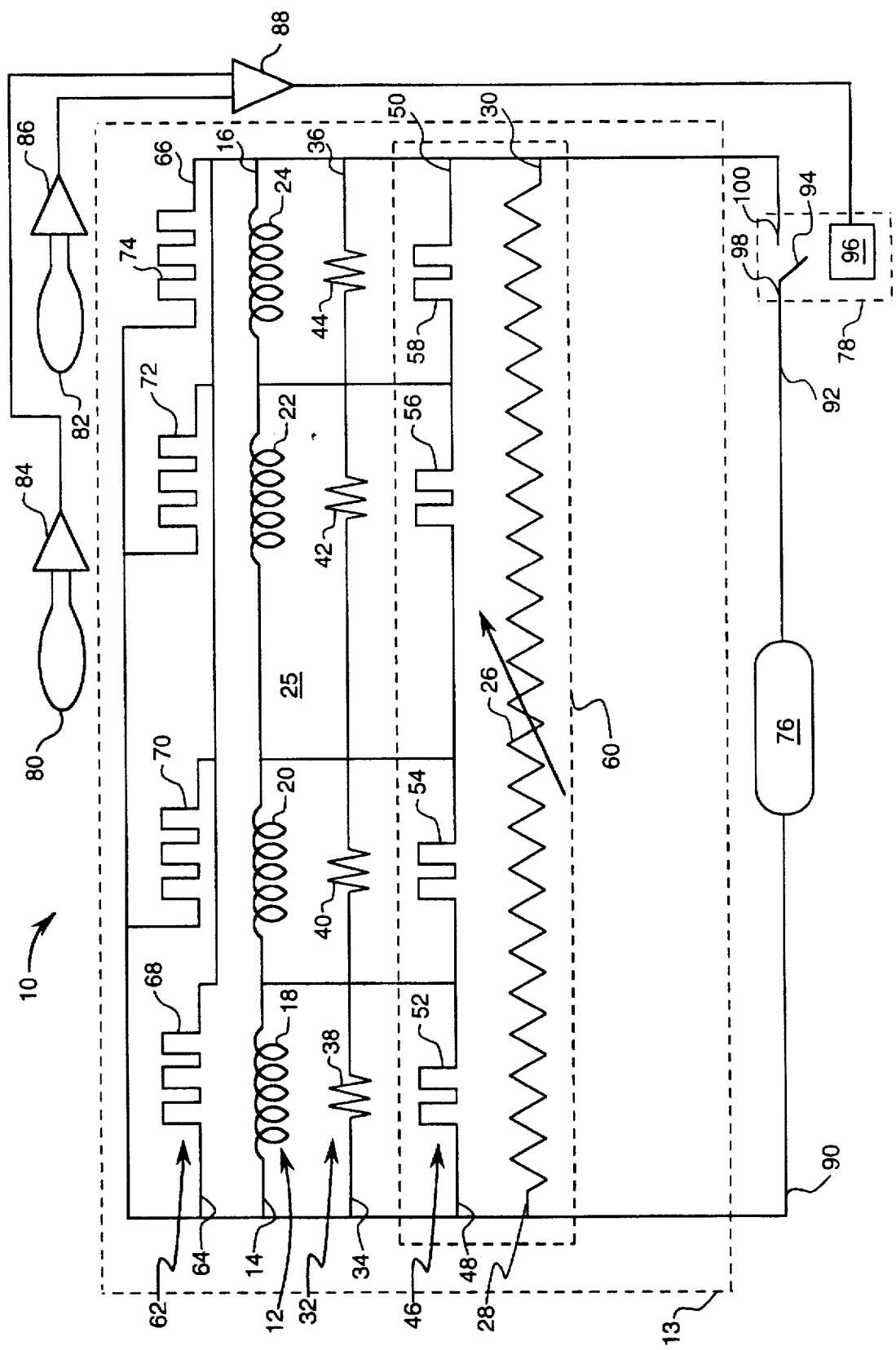

5,731,939

1

QUENCH-PROTECTING ELECTRICAL CIRCUIT FOR A SUPERCONDUCTING MAGNET

BACKGROUND OF THE INVENTION

The present invention relates generally to superconductive magnets and more particularly to a superconducting-magnet electrical circuit which protects its superconductive-coil assemblage from damage during a quench.

Superconducting magnets are those superconducting devices which have a superconductive-coil assemblage and include, but are not limited to, magnetic resonance imaging (MRI) systems for medical diagnosis, superconductive rotors for electric generators and motors, and magnetic levitation devices for train transportation. Magnets wound of superconductive material offer the advantage that they can carry significant electrical currents without suffering any power loss due to the fact that superconductive windings offer no resistance to electrical current flow. As a consequence of this zero resistance property, wire or tape that is quite small is capable of carrying very large currents in the superconducting state. This property has been especially beneficial in the construction of MRI magnets because they require very high static magnetic fields.

When designing superconducting magnets, however, one must consider the possibility that the superconducting wire or tape may "lose" its superconducting capabilities at some point and become resistive. This transformation from a superconducting state to a resistive state is known as "quenching". "Quenching" may be caused, for example, by loss of the cryocenic cooling (such as from liquid helium) needed to keep the temperature of the superconductive material at or below the critical temperature needed for superconductivity to occur. In the event that the superconductive wire becomes resistive, the wire that normally carries the large electrical currents with no resistive heating now generates both high voltages and high power losses. These voltages and power losses can be quite damaging to the magnet if they are allowed to become too large or remain too localized.

As a consequence of the above, magnets are designed such that the "quench" is propagated as quickly as possible after initiation; that is, if some area of the winding quenches, the magnet is designed so that the entire winding becomes resistive as soon as possible. This design criteria results in lower voltages and lower peak temperatures since the stored energy of the magnet is dispersed throughout a larger mass. Known quench protection techniques include using a quench-detection signal (from the electrical center of the superconductive coil assemblage of the superconductive device) directly supplying an energy dump resistor or directly powering a wide-area electrical heater located near the superconductive coil assemblage of the superconductive device. Such known techniques take a relatively long time to work. It is also known to amplify the quench-detection signal outside the cryostat, but this raises issues of reliability and additional cryostat penetrations.

SUMMARY OF THE INVENTION

It is an object of the invention to provide an electrical circuit which protects a superconductive magnet from damage during a quench.

The superconductive-magnet electrical circuit of the invention includes a cryostable superconductive-coil assemblage, an impregnated superconductive-switch wire, a dump resistor assemblage, a fan-in heater assemblage, and a fan-out heater assemblage. The first and second leads of the superconductive-switch wire, the dump resistor assemblage, the fan-in heater assemblage, and the fan-out heater assemblage are coupled, respectively, with the first and second leads of the superconductive-coil assemblage. The superconductive-coil assemblage has at least four coil portions coupled together in series. The dump resistor assemblage has a number of dump resistors coupled together in series, wherein each dump resistor also is coupled in parallel with a separate one of the coil portions. The fan-in heater assemblage has a number of fan-in resistive heaters coupled together in series, wherein each fan-in resistive heater also is coupled in parallel with a separate one of the coil portions, and wherein each fan-in resistive heater is positioned thermally proximate the superconductive-switch wire. The fan-out heater assemblage has a number of fan-out resistive heaters coupled together in parallel, wherein each fan-out resistive heater is positioned thermally proximate a separate one of the coil portions.

Several benefits and advantages are derived from the invention. The superconductive-magnet electrical circuit does not require any additional cryostat penetrations. When a quench occurs in a local area of one coil portion, a small current will flow through the associated fan-in resistive heater to quickly cause the superconductive-switch wire to quench which causes a large current to flow through each fan-out resistive heater to quickly quench the entire superconductive-coil assemblage which prevents coil damage that would otherwise occur if the quench in the local area of the one coil portion were not quickly shared throughout that one coil portion and throughout all of the other coil portions. The dump resistors limit quench voltages.

BRIEF DESCRIPTION OF THE DRAWINGS

The accompanying drawing illustrates a first preferred embodiment of the present invention wherein:

The FIGURE is a schematic circuit diagram of a first preferred embodiment of the superconductive-magnet electrical circuit which protects its superconductive-coil assemblage from damage during a quench.

DETAILED DESCRIPTION OF THE INVENTION

Referring now to the drawings, the FIGURE shows a first preferred embodiment of the superconductive-magnet electrical circuit 10 of the present invention. The superconductive-magnet electrical circuit 10 includes a cryostable superconductive-coil assemblage 12. "Cryostable" (sometimes referred to as "non-impregnated") is a conventional term of art used in the superconducting magnet field to indicate that the superconductive-coil assemblage 12 is designed to be cooled by direct physical contact of a fluid cryogen (such as liquid, and some top-layer gaseous, helium having a temperature of generally 4 Kelvin) with the superconductor wire or tape windings that make up the superconductive-coil assemblage 12. Referring to the FIGURE, the superconductive-coil assemblage 12 is disposed within a cryostat enclosure 13 (shown in dashed line in the FIGURE). Preferably, the superconductor wire or tape is a copper-stabilized Nb-Ti wire having a porous electrical insulation (such as a conventional spiral-wound porous electrical insulation that also has gaps between adjacent spiral turns), and the fluid cryogen permeates the porous insulation to make direct physical contact with the copper-stabilized Nb-Ti wire. The superconductive coil assemblage 12 has first and second leads (i.e., assemblage leads) 14 and 16. The superconductive coil assemblage 12 has at least four (and preferably 6–16) coil portions 18, 20, 22, and 24, coupled together in series (i.e., coupled together in series between and with the first and second leads 14 and 16 of the superconductive-coil assemblage 12) and preferably essentially completely in contact with a fluid cryogen 25 contained within the cryostat enclosure 13. In certain MRI applications, a coil portion 18, 20, 22, and 24 is chosen to be an entire main coil (a main coil is a coil whose purpose is to help create a high magnetic field strength in the imaging volume of the magnet), an entire bucking coil (a bucking coil is a coil carrying current in an opposite direction to the main coils which is positioned to shape a more homogeneous magnetic field within the imaging volume), or an entire shielding coil (a shielding coil is a coil carrying current in an opposite direction to the main coils which is positioned to prevent stray magnetic fields from escaping the magnet). In other MRI applications, a coil portion 18, 20, 22, and 24 may be, for example, one-fourth of a main coil, one-half of a shielding coil, etc.

The electrical circuit 10 also includes an impregnated superconductive-switch wire 26. "Impregnated" is a conventional term of art used in the superconducting magnet field to indicate that the superconductive-switch wire 26 is surrounded by an impervious coating (e.g., epoxy) such that the superconductive-switch wire 26 is free of direct physical contact with a fluid cryogen and must be cooled instead by internal thermal conduction along the length of the superconductive-switch wire 26 (and by thermal conduction through the epoxy between the windings of the superconductive-switch wire 26). Referring to the FIGURE, the superconductive-switch wire 26 is disposed within the cryostat enclosure 13 essentially completely free of contact with the fluid cryogen 25 because of the impregnation of the superconductive-switch wire 26. Preferably, the superconductive-switch wire 26 is an epoxy-impregnated, copper-stabilized Nb-Ti superconductive wire. The superconductive-switch wire 26 has first and second leads 28 and 30 coupled, respectively, with the first and second leads 14 and 16 of the superconductive-coil assemblage 12. Preferably, the superconductive-switch wire 26 is a ramping-switch superconductive wire (as indicated schematically in the FIGURE by the arrow intersecting the superconductive-switch wire 26). A ramping-switch superconductive wire is the superconductive-wire portion of a conventional ramping switch which also includes a heater portion (omitted from the FIGURE for clarity). As is known to the artisan, a ramping switch typically is disposed in the cryogenic fluid, and, by turning on and off the heater portion, can switch the superconductive-wire portion between a resistive and a superconductive mode (i.e., state of operation). The superconductive switch is used to transfer the superconductive-coil assemblage 12 between a persistent superconducting operating mode and a non-persistent superconducting operating mode. Typically the superconductive switch is used to start up superconductive operation of the superconducting-coil assemblage 12 and to purposely run down such superconductive operation. Preferably, the superconductive-switch wire 26 has less than generally one-hundredth the volume of the superconductive-coil assemblage 12.

The electrical circuit 10 additionally includes a dump resistor assemblage 32 having first and second leads (i.e., assemblage leads) 34 and 36 coupled, respectively, with the first and second leads 14 and 16 of the superconductive-coil assemblage 12. Referring to the FIGURE, the dump resistor assemblage 32 is disposed within the cryostat enclosure 13. The dump resistor assemblage 32 has a plurality of dump resistors 38, 40, 42, and 44 coupled together in series (i.e., coupled together in series between and with the first and second leads 34 and 36 of the dump resistor assemblage 32). Each dump resistor 38, 40, 42, and 44 also is coupled in parallel with a separate one of the coil portions 18, 20, 22, and 24 as shown in the FIGURE. Preferably, the dump resistors 38, 40, 42, and 44 are generally identical dump resistors.

The electrical circuit 10 further includes a fan-in heater assemblage 46 having first and second leads (i.e., assemblage leads) 48 and 50 coupled, respectively, with the first and second leads 14 and 16 of the superconductive-coil assemblage 12. Referring to the FIGURE, the fan-in heater assemblage 46 is disposed within the cryostat enclosure 13 (and specifically within the superconductive ramping switch thermally proximate the superconductive-switch wire 26). The fan-in heater assemblage 46 has a plurality of fan-in resistive heaters 52, 54, 56, and 58 coupled together in series (i.e., coupled together in series between and with the first and second leads 48 and 50 of the fan-in heater assemblage 46). The term "fan-in" is an arbitrary term used by Applicants to distinguish these resistive heaters from other resistive heaters in the circuit. Each fan-in resistive heater 52, 54, 56, and 58 also is coupled in parallel with a separate one of the coil portions 18, 20, 22, and 24, and each fan-in resistive heater 52, 54, 56, and 58 additionally is disposed thermally proximate the superconductive-switch wire 26, as shown in the FIGURE. Preferably, the fan-in resistive heaters 52, 54, 56, and 58 are generally identical resistive heaters. In an exemplary construction, the fan-in heater assemblage 46 and the superconductive-switch wire 26 are packaged together as a unit 60 (shown in dashed line in the FIGURE).

The electric circuit 10 moreover includes a fan-out heater assemblage 62 having first and second leads (i.e., assemblage leads) 64 and 66 coupled, respectively, with the first and second leads 14 and 16 of the superconductive-coil assemblage 12. Referring to the FIGURE, the fan-out heater assemblage 62 is disposed within the cryostat enclosure 13 (and specifically thermally proximate the coil portions 18, 20, 22, and 24 of the superconductive-coil assemblage 12). The fan-out heater assemblage 62 has a plurality of fan-out resistive heaters 68, 70, 72, and 74 coupled together in parallel (i.e., coupled together in parallel between and with the first and second leads 64 and 66 of the fan-out heater assemblage 62). The term "fan-out" is an arbitrary term used by Applicants to distinguish these resistive heaters from other resistive heaters in the circuit. Each fan-out resistive heater 68, 70, 72, and 74 is disposed thermally proximate a separate one of the coil portions 18, 20, 22, and 24, as shown in the FIGURE. Preferably, the fan-out resistive heaters 68, 70, 72, and 74 are generally identical resistive heaters.

It is noted that the superconductive-coil assemblage 12 and the superconductive-switch wire 26 are superconducting elements of electric circuit 10, and the dump resistor assemblage 32, the fan-in heater assemblage 46, and the fan-out heater assemblage 62 are resistive elements of electric circuit 10. It is further noted that the superconductive-coil assemblage 12 and the superconductive-switch wire 26 have a superconductive mode and a resistive (i.e., quenched) mode. Preferably, all of the first leads 14, 28, 34, 48, and 64 of the superconductive-coil assemblage 12, the superconductive-switch wire 26, the dump resistor assemblage 32, the fan-in heater assemblage 46, and the fan-out heater assemblage 64 are coupled together so as to be essentially at the same voltage when the electric circuit 10 is operating in the resistive mode. Likewise, preferably all of the second leads 16, 30, 36, 50, and 66 of the superconductive-coil assemblage 12, the superconductive-switch wire 26, the dump resistor assemblage 32, the fan-in heater assemblage 46, and the fan-out heater assemblage 64 are coupled together so as to be essentially at the same voltage when the electric circuit 10 is operating in the resistive mode.

It is noted that, in many MRI superconducting magnets, quench protection must operate in approximately two seconds after the localized magnet quench spontaneously starts. However, the potentially-damaging temperatures and stresses applied by the localized quench to the superconductive- coil assemblage 12 increase very rapidly with increasing protection system operating time so that every tenth of a second speed-up in the protection system operation provides a significant benefit in avoiding damage to the superconductive- coil assemblage 12. The superconductive-magnet electrical circuit 10 of the present invention provides reliable, fast-acting quench protection with low actuation energy.

The operation and advantages of the electric circuit 10 of the invention in protecting the superconductive-coil assemblage 12 will now be discussed. When the electric circuit 10 is operating in the superconducting mode, electric current essentially will only flow in the superconducting loop consisting of the superconductive-coil assemblage 12 and the superconductive-switch wire 26. In the superconducting mode of electric circuit 10, no electric current will flow through, and no heat will be generated by, the dump resistor assemblage 32, the fan-in heater assemblage 46, or the fan-out heater assemblage 62. Referring to the FIGURE, assume a quench starts in a local area of coil portion 20. This will set up a voltage difference in coil portion 20, and thus a voltage difference in fan-in resistive heater 54. Fan-in resistive heater 54 will heat up and quench the nearby superconductive-switch wire 26. This will set up a voltage difference between the first and second leads 64 and 66 of the fan-out heater assemblage 62 and through each of the fan-out resistive heaters 68, 70, 72, and 74. The fan-out resistive heaters 68, 70, 72, and 74 all will heat up and evenly quench the entire coil portion 20 as well as the other entire coil portions 18, 22, and 24. It is noted that the dump resistors 38, 40, 42, and 44 limit the high voltages experienced by the electric circuit 10 during a quench event to levels that can be handled by the electrical insulation in the electric circuit 10.

In an exemplary embodiment, the electric circuit 10 also protects the superconductive-coil assemblage during a quench that occurs during ramp up. To that end, the electric circuit 10 preferably includes a power supply 76, a relay 78 (shown in dashed line in the FIGURE), generally identical first and second flux loops 80 and 82, and first, second, and third differential amplifiers 84, 86, and 88, all of which are disposed outside the cryostat enclosure 13 as shown in the FIGURE. The power supply 76 is used to ramp up the superconductive-coil assemblage 12 after which it is switched out of the electric circuit 10 (such switching omitted from the FIGURE for clarity). The power supply 76 has first and second leads 90 and 92 which may include lead resistance (such lead resistance omitted from the FIGURE for clarity). The first lead 90 of the power supply 76 is coupled to the first lead 14 of the superconductive-coil assemblage 12.

The relay 78 has a (normally-open) switch portion 94 and an actuator portion 96. The actuator portion 96 is operatively coupled to open and close the switch portion 94. The switch portion 94 has a first lead 98 coupled to the second lead 92 of the power supply 76 and a second lead 100 coupled to the second lead 16 of the superconductive-coil assemblage 12.

Each differential amplifier 84, 86, and 88 has two inputs and one output and each flux loop 80 and 82 has two ends as shown in the FIGURE. The two ends of the first flux loop 80 each are coupled to a separate one of the two inputs of the first differential amplifier 84. The two ends of the second flux loop 82 each are coupled to a separate one of the two inputs of the second differential amplifier 86. The outputs of the first and second differential amplifiers 84 and 86 each are coupled to a separate one of the two inputs of the third differential amplifier 88. The output of the third differential amplifier 88 is coupled to the actuator portion 96 of the relay 78.

Although not shown in the FIGURE, preferably the flux loops 80 and 82 are disposed in the bore of the cryostat enclosure 13, the superconductive-coil assemblage 12 has a generally longitudinally-extending axis and includes a pair of longitudinally-outermost portions, and the flux loops 80 and 82 each are generally coaxially aligned with the axis and disposed proximate a separate one of the pair of longitudinally-outermost portions of the superconductive-coil assemblage 12, as can be appreciated by those skilled in the art. In operation, the power supply 76, through the normally-closed switch portion 94, ramps up the superconductive-coil assemblage 12. If a quench occurs in a local area of one the coil portions 18, 20, 22, and 24 during ramp-up, it will be detected by the unbalance in the flux loops 80 and 82, such unbalance cascading to the third differential amplifier 88 which triggers the actuator portion 96 of the relay 78 to open the switch portion 94 of the relay 78. At this point during the local quench, the portion of the electric circuit 10 within the cryostat enclosure 13 operates as previously discussed to protect the superconductive-coil assemblage.

A more philosophical discussion of the electric circuit 10 of the invention follows. From the previous description, the superconductive-magnet electrical circuit 10 of the invention is seen to be configured to allow efficient propagation of a quench, occurring in any section of the superconducting conductor, thus spreading the quench to other electrically or physically remote sections of the entire magnet. The constraints in this objective are rapid spread of the quench to limit localized temperature rises, limited voltage excursions to inhibit electrical breakdown, and limited current excursions to inhibit excessive magnetic energy storage and Lorentz force imbalances. Some effective solutions previously presented are to segment the magnet coils for rough uniformity of energy deposition, to use clamping resistors for limiting voltages between various strategic points in the circuit, to allow rapid destabilization of the initial superconducting electrical state, and to couple auxiliary passive heaters to access remote non-quenched points by use of voltages derived early in the quench process. A bistable design was presented which was stable during superconducting operation and which was unstable during a quench.

The magnetic coil segmentation in the extreme limit allows the approach to a quenched state with small thermal strains and small electrical stresses, which is an ideal. In practice, only a limited number of segmentations is feasible, say 6–16, as is required for magnetic homogeneity, and the quench protection design must compensate for the anomalies caused by insufficient segmentation. For fewer segmentations, or larger cells, it is more difficult to propagate the quench in a limited time throughout the coil volume. Additionally, the capability must exist to destroy the magnetic state within a limited duration, say 1 minute, for safety reasons, without adversely impacting the integrity of the magnet system.

It is noted that cryostable superconducting magnet operation is by definition a state that is more insensitive to external disturbances than it would be under a less stable criteria, which would allow the initiation and propagation of a normal zone (i.e., a quench process). At the same time, however, it is imperative to allow for the possibility of a massive enough disturbance such that a normal zone is formed and with it an irreversible quench process, in a cryostable magnet. The two states, usual superconductive operation and normal resistive transition, are incompatible in intent and physical realization. A coupling system (i.e., the superconductive-switch wire 26 needed to be introduced such that once a quench state was sensed, the coupling system caused an abrupt transformation of the cryostable steady state to a stable state of transition to normal (i.e., resistive) zones everywhere in the superconducting conductor. Without the coupling system, the initial quench would consume energy at an ever larger rate within a volume of normal conductor that, inhibited by cryostability, would only grow very slowly. This would cause high thermal differences, thermal strains, and electrical and magnetic stresses. The result is usually catastrophic.

It is noted that conventional cryostable magnets have several strong constraints in their design in order to satisfy the complete stability criteria, including the superconducting-to-normal thermal balance transition and more importantly the possibility of wire motion and its associated energy dissipation by coupling to the magnetic field. The wire must be well exposed to liquid cryogens and it must also be wound at very high tension in order to inhibit wire motion caused by fluctuating magnetic forces as the magnet is ramped in current, as well as during a quench. Several heaters have been conventionally used concurrently with the intent to propagate quenches to separate coil sections that may have a higher degree of stability and/or lower associated mass, such that in case of a quench, these regions are additionally protected from overheating. However conventional [coil-to-coil] type heater coil couplings have proven to be completely ineffective in cryostable designs due to the slow nature of quench propagation of the highly stabilized superconductor, resulting in an excessive delay of normal actuation. The missing component in conventional designs is the ability to cause a rapid and sizable power density to promptly drive coils to the normal (i.e., resistive) state. As previously discussed in describing the electric circuit 10 of the invention, the abrupt transformation from cryostable to highly unstable quench or stable normal (i.e., resistive) transition must by definition be achieved by a highly nonlinear device. The nature of the cryostability criteria is to balance as much as possible Ohmic heating and liquid cryogen cooling in the normal (i.e., resistive) state, therefore there is by design of the superconductor no great excess of Ohmic heating to rapidly drive the quench propagation event. While an initiating quench process may be a nonlinear transformation in the case of cryostable wire, well cooled by cryogens at its perimeter, but nevertheless propagating, it is not sufficiently rapid in propagation to provide sufficient energy dissipation rate and prevent the overheating of the oldest normal zones by the time most of the magnetic energy has been exhausted. As has been seen by the electric circuit 10 of the invention, a system (i.e., superconductive-switch wire 26) of lesser stability is introduced as an intermediary, such that its rapid quenching corresponds to an amplification of the effect of the initial quench. Such an intermediary has been chosen, and previously described, to consist of the impregnated superconductive-switch wire 26 of a superconductive switch that has a poor cooling access to the liquid cryogen, but also has a much lower heat capacity per configuration lattice (i.e., conductor unit length) than the cryostable coil portions 18, 20, 22, and 24. Any initiating quenching coil portion causes the superconductive-switch wire 26 to switch to the normal (i.e., resistive) mode by means of the coil's own heater connection; subsequently, the superconductive-switch wire 26 rapidly develops a large voltage that powers the fan-out resistive heaters 68, 70, 72, and 74 coupled to each and every coil portion 18, 20, 22, and 24 in return.

Cryostable superconducting magnets offer several opportunities for manufacturing cost savings including lower cost wire due to more efficient superconductor utilization and fewer manufacturing sequence steps (impregnation, machining, etc.). However, the cryostable state is incompatible with the requirement that the magnet be allowed to run a quench to completion safely because the excess stability of the cryostable state interferes with the efficient propagation of the normal zones developed at the initial quench location and it is therefore insufficient to rely on the natural AC loss couplings that tend to heat the superconducting wire through the normal transition point, because the cooling on the wire perimeter is several times larger than the AC losses. To overcome these dual incompatible requirements, an intermediate strongly-nonlinear device, that acts as a high gain amplifier, was introduced. The device, in a first preferred embodiment, conveniently consisted of the superconductive-switch wire 26 of the ramping switch for the magnet. The switch is a compact wire-wound spool, with approximately two orders of magnitude less material than the main coils themselves, is impregnated by necessity (to allow a lower electrical dissipation into the liquid inventory during the ramping process), and is provided with heaters to be able to effectuate a normal transition upon demand. Because of the lower heat capacity of the switch lattice (including epoxy impregnant) compared to the coil portions of the cryostable superconductive-coil assemblage 12 (with coupled liquid) and because of its high thermal conductance to the cooling medium, the superconductive-switch wire 26 of the switch is relatively easier to drive normal at a fixed power density compared to the cryostable lattice. The compact size of the switch also allows the entire event of propagating the quench within the switch to occur within about 0.05 seconds, with an additional 0.05 seconds to fully develop a major fraction of normal resistance, compatible with the parallel resistance of the series chain of dump resistors 38, 40, 42, and 44 across the magnet coil portions 18, 20, 22, and 24. Thus, the switch is protected against over-current by the coil dump resistors. The additional manufacturing requirements compared to a standard superconducting switch are minimal. They are that there be a coupled set of fan-in resistive heaters 52, 54, 56, and 58 built within the switch, each powered by the voltage developed across corresponding coil section dump resistor, and in turn, that there be coupled electrically across the entire switch a second set of fan-out resistive heaters 68, 70, 72, and 74 whose proximity heat actuation drives each and every coil portion 18, 20, 22, and 24 normal in a rapid sequence of events. For convenience and modularity reasons, the dump resistor is segmented in equal electrical resistance fractions even though the corresponding coil segments in parallel with each one are not of equal self inductance, or equal associated energy. It is reasonable, however, to design the coil/dump network such as not to obtain too wide a range of eigenvalues, or correspondingly, coil decay time constants, meaning not too large a range of coil inductances.

The network of gathering, or collecting, the individual signals from each coil voltage, powering a respective heater and driving the superconducting switch normal is referred to as the gather, or "fan-in", stage of the quench protection system. The network of scattering, or distributing, the common signal from the now normal switch voltage to heaters, each respectively tightly coupled to an individual coil and driving the superconducting coil normal is referred to as the scatter, or "fan-out", stage of the quench protection system. One or several target locations for heaters applied to coil positions may be considered per coil portion. The "fan-in" and "fan-out" heater network is global, involves a coupling between each coil portion forward to the superconductive wire of the superconductive switch and a second coupling forward from the superconductive wire of the switch back to each coil portion. The fact that there is a clamping set of dump resistors across the superconductive wire of the superconductive switch and superconductive wire of the superconductive switch allows a design for the highest voltage exposure of the heaters so that in turn they are not thermally over stressed. Experimentally it has been determined that a certain commercial (Minco) heater design can repeatedly operate to in excess of 10 Watts/sq. cm. Thus specifying the necessary area for an effective coupling of heater-to-coil at roughly 4 sq. in. puts the maximum heater output at about 250 Watts. Given the mild constraints of the existence of certain commercial heater resistance per area combinations, a choice can be made to satisfy this type of design. Due to the rapid (0.1 second) propagation of the quench throughout the switch, most of the 250 W is available within about 0.25 second after the "fan-in" stage has operated. The combination of coil operating current and series dump resistance produces approximately 60–80 Volts in the particular design at hand.

The existing commercial heaters do not provide conveniently more than 10 Watts/sq. cm simply due to insulation overheating. They are also constrained to minimum values of several Ohms for a prerequisite of a minimum of 2–3 sq. in. Given a quench analysis code that addresses in detail the issue of modeling the quench event, associated impedances, and all other physical transient characteristics about the quench, clearly an initiating coil of a cryostable type cannot develop a sufficient normal zone sufficiently rapidly to produce the corresponding 250 W that is available from the "fan-out" stage switch voltage. However, for most circumstances of disturbances in any superconducting coil section, a voltage development transient naturally gives rise to typically 4.0 Volts in about 0.5 sec. This, given approximately one Ohm per square inch, is the threshold for triggering the switch lattice material into the normal state, roughly 0.12 W/sq. cm. Given the quadratic nature of Ohmic dissipation ,this voltage applied to a "fan-out" stage resistive heater would only yield 1% of the power density of the "fan-out" stage itself, which is insufficient to drive and sustain a normal zone in the superconducting coil portions. The design must also account for heater survival during the largest coil voltage exposure, which tends to occur several seconds after the initiation of the quench.

Evidently by the transformation of the coil portions to the "fan-in" heaters to the superconductive wire of the superconductive switch to the "fan-out" heaters to the coil portions, the equivalent impedance of the heaters has been reduced by about two orders of magnitude, or in effect, a passive component voltage amplifier has been inserted in the coil-heater-coil desired thermal coupling. The equivalent passive amplifier is the superconducting wire of the superconductive switch, whose physical properties are completely different from those of the coil portions.

Due to the high gain equivalent of the "switch amplifier", the minimum coil normal transition power density is exceeded by at least an order of magnitude and because the switch quench event is as rapid as 0.1 second, with a "fan-in" stage delay of 0.5 second, the synchronization of initiating the secondary quenches in all coil portions other than the primary initiating coil portion is to roughly 0.1 second, or less. It is also true that the "fan-out" stage drives the primary initiating coil portion itself normal at a location probably remote from the initiating normal zone, but synchronized with the other coil portions.

It is important to note that the synchronism feature of the "fan-in/fan-out" (FIFO) system is minimal in components used to spread the quench. The FIFO system relies on twice as many heaters as there are coil portions. Let N be the number of coils. The only other logical alternative (avoiding the switch intermediary) is a matrix of (N-1) electrically coupled heaters per each coil, thermally coupled to every other coil. The number of heaters in this scheme is (N-1)N, compared to the 2N heaters of the FIFO scheme.

The individual coil quench propagation depends on current density, cooling perimeter, local magnetic field and AC losses. The first two of these have strong reason to be very similar from coil portion to coil portion due to the coil quench synchronization. The AC losses are vastly dominated by the liquid cooling so they do not differentiate coil quench propagation appreciably. The magnetic field does have local dependencies so it is just about the only modulating term. For homogeneity reasons, in usual magnet designs, the coil portions are entire coils symmetrically positioned about a midplane, in the axial direction, and therefore the magnet current will decay in roughly axially symmetric manner if the electrical associated network is also axially symmetric (which is the usual case). This is important in that the coil current changes being driven by similar voltages, by convenient design of equal dump resistors, will produce approximately similar current transient in all coils. This synchronization is important because it tends to maintain or not widely exceed the maximum peripheral field radius during quench compared to the superconducting operation.

During the process of ramping the magnet up or down the superconductive wire of the superconductive switch is in the normal (i.e., resistive) state. Care must be taken in the design of "fan-out" heater power densities for the ramping stage such that the "fan-out" heaters do not cause a quench in any one coil. This situation is dealt with by setting a maximum ramp rate voltage such that the heater power density exposure of the coil is less than about 0.004 Watts/sq. cm, which has been calculated to be safe for ramping at lower field (up to ⅔ full field; highest coil field is 3.5T locally). The ramp rate is reduced over the latter part of the ramp in order to avoid the increased sensitivity to quench due to reduced normal transition margin.

Cryostat design constraints have forced a difficult issue into the quench protection design. The compact nature of the venting system, the requirement that there be some substantial amount of gas buffer for over-pressurization above the liquid, causes part of the magnet coils to always be operated in gas rather than liquid coolant. The cryostability conditions are radically different for gas and liquid. This causes a differentiation of quench propagation in the two distinct media and consequently different protection requirements. The system described above is structured to handle the more difficult in-liquid propagation problem. If a quench initiates in gas, its propagation is more rapid, triggers the superconductive wire of the superconductive switch into normal more rapidly, and brings about the effect of the "fan-out" stage.

Finally, having an approximately similar current transient in all coil portions causes relatively small Lorentz (magnetic) force anomalies between the various coil portions, unlike a case where a single portion would decay and leave unaffected the current in the rest of the coil portions. This latter situation will cause severe stresses relative to the magnetic anomaly of the partially decayed coil, and the present quench protection system prevents it.

The net result of this quench protection system is that a quench event is completed within 2–3 seconds of initiation, the magnet is safely run down to low energy, and magnetic forces are minimized.

Due to the configuration that the power supply essentially shorts out the superconductive wire of the superconductive switch while it is connected, primarily during ramping, it was necessary to add a circuit breaker in the form of a normally open relay 78 that, upon sensing a quench, disconnects the power supply network loop.

The quench initiation sensing is achieved by means of two symmetrically positioned, multi-turn, resistive-wire flux loops 80 and 82 intercepting magnetic flux at each end of the magnet. When a quench occurs, the high gain differential amplifier senses an imbalance in the flux loop inputs and triggers off the relay, interrupting the power supply circuit continuity. This event, in turn, allows the already quenched superconductive wire of the superconductive switch, if ramping, to develop full voltage and promptly quench all coils in synchronism. If the superconductive-switch wire 26 of the superconductive switch is already in the superconducting state, the earlier description of event sequence holds, and approximately one-half second into the quench, the secondary quenches begin.

It is noted that the actual coil voltage is importantly modulated and limited by the dump resistors which act to protect coils, superconductive wire of the superconductive switch, and heaters from overheating. As seen from the FIGURE, there are 4 interface couplings, alternating from electrical to thermal. This scheme makes use of the superconducting wire of the superconductive switch which acts as a high gain amplifier that senses a quench anywhere in any coil portion and broadcasts a quenching message, in turn, to all areas in all coil portions.

In summary, a quench protection system, in the form of an electric circuit 10, has been disclosed for cryostable magnets that relies on magnet coil segmentation and individual segment electrical clamping by dump resistors. In order to enhance the naturally slowly propagating quench of the cryostable magnet, a superconductive wire (of preferably a superconductive switch) is used as an intermediary that can be relatively easily quenched by heaters whose input power is derived from the small and sluggish voltages generated across the magnet coil portions. The superconductive wire (of preferably the superconductive switch), in the normal state, serves as the power source for a secondary set of heaters that in turn cause a normal transition evenly throughout all areas of each and every coil portion.

The quench protection system, in the form of the described electric circuit 10 has been designed, built, and successively tested in several versions for magnets of 1.5 Tesla and 1.0 Tesla central fields and with a variety of numbers of coil segmentations from 8, to 10, to 14 coil portions.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. A superconductive-magnet electrical circuit comprising:
   a) a cryostable superconductive-coil assemblage having first and second leads and having at least four coil portions coupled together in series;
   b) an impregnated superconductive-switch wire having first and second leads coupled, respectively, with said first and second leads of said superconductive-coil assemblage;
   c) a dump resistor assemblage having first and second leads coupled, respectively, with said first and second leads of said superconductive-coil assemblage and having a plurality of dump resistors coupled together in series, wherein each dump resistor also is coupled in parallel with a separate one of said coil portions;
   d) a fan-in heater assemblage having first and second leads coupled, respectively, with said first and second leads of said superconductive-coil assemblage and having a plurality of fan-in resistive heaters coupled together in series, wherein each fan-in resistive heater also is coupled in parallel with a separate one of said coil portions, and wherein each fan-in resistive heater is disposed thermally proximate said superconductive-switch wire; and
   e) a fan-out heater assemblage having first and second leads coupled, respectively, with said first and second leads of said superconductive-coil assemblage and having a plurality of fan-out resistive heaters coupled together in parallel, wherein each fan-out resistive heater is disposed thermally proximate a separate one of said coil portions.

2. The circuit of claim 1, wherein said coil portions are essentially completely in contact with a fluid cryogen.

3. The circuit of claim 2, wherein said superconductive-switch wire is essentially completely free of contact with said fluid cryogen.

4. The circuit of claim 3, wherein said superconductive-switch wire has less than generally one-hundredth the volume of said superconductive-coil assemblage.

5. The circuit of claim 4, wherein said dump resistors are generally identical dump resistors, said fan-in resistive heaters are generally identical resistive heaters, and said fan-out resistive heaters are generally identical resistive heaters.

6. The circuit of claim 5, wherein said fan-in heater assemblage and said superconductive-switch wire are packaged together as a unit.

7. The circuit of claim 6, wherein said superconductive-switch wire is a ramping-switch superconductive wire.

8. The circuit of claim 1, wherein said superconductive-coil assemblage, said superconductive-switch wire, said dump resistor assemblage, said fan-in heater assemblage, and said fan-out heater assemblage are disposed within a cryostat enclosure.

9. The circuit of claim 8, also including a power supply disposed outside said cryostat enclosure and having first and second leads, wherein said first lead of said power supply is coupled with said first lead of said superconductive-coil assemblage.

10. The circuit of claim 9, also including a relay disposed outside said cryostat enclosure and having a normally-closed switch portion and an actuator portion, wherein said actuator portion is operatively coupled to open and close said switch portion, and wherein said switch portion has a first lead coupled to said second lead of said power supply and a second lead coupled to said second lead of said superconductive-coil assemblage.

11. The circuit of claim 10, also including generally identical first and second flux loops disposed outside said cryostat enclosure and each having two ends and further including first, second, and third differential amplifiers disposed outside said cryostat enclosure and each having two input terminals and one output terminal, wherein said two ends of said first flux loop each are coupled to a separate one of said input terminals of said first differential amplifier, wherein said two ends of said second flux loop each are coupled to a separate one of said input terminals of said second differential amplifier, wherein said output terminals of said first and second differential amplifiers each are coupled to a separate one of said input terminals of said third differential amplifier, and wherein said output terminal of said third differential amplifier is coupled with said actuator portion of said relay.

* * * * *